(12) United States Patent
Benedict et al.

(10) Patent No.: US 9,919,657 B2
(45) Date of Patent: Mar. 20, 2018

(54) RETAINING DEVICE FOR VEHICLE RACKS

(71) Applicant: Arctic Cat Inc., Thief River Falls, MN (US)

(72) Inventors: Timothy Benedict, Thief River Falls, MN (US); Jeffrey Lane, Thief River Falls, MN (US)

(73) Assignee: Arctic Cat, Inc., St. Cloud, MN (US)

( * ) Notice: Subject to any disclaimer, the term of this patent is extended or adjusted under 35 U.S.C. 154(b) by 150 days.

(21) Appl. No.: 14/846,339

(22) Filed: Sep. 4, 2015

(65) Prior Publication Data

US 2017/0066383 A1    Mar. 9, 2017

(51) Int. Cl.
| | |
|---|---|
| B60R 9/06 | (2006.01) |
| B60R 9/00 | (2006.01) |
| F16B 2/18 | (2006.01) |
| F16B 13/04 | (2006.01) |
| F16B 5/06 | (2006.01) |

(52) U.S. Cl.
CPC ............. B60R 9/06 (2013.01); B60R 9/00 (2013.01); F16B 2/18 (2013.01); F16B 5/0642 (2013.01); F16B 13/04 (2013.01)

(58) Field of Classification Search
CPC ..... B60R 2011/0052; B60R 2011/0059; B60R 9/00; B60R 9/06; B60R 11/00; Y10T 24/44026; F16B 19/109
See application file for complete search history.

(56) References Cited

U.S. PATENT DOCUMENTS

| | | | |
|---|---|---|---|
| 1,662,718 A | 3/1928 | Regard | |
| 2,377,086 A * | 5/1945 | Lang ..................... | B25B 31/005 29/238 |
| 3,702,167 A | 11/1972 | Olson | |

(Continued)

FOREIGN PATENT DOCUMENTS

| | | |
|---|---|---|
| CA | 2467537 A1 | 5/2003 |
| EP | 1371520 A2 | 11/2003 |

(Continued)

OTHER PUBLICATIONS

Review Kuat NV Rack; http://www.sicklines.com/reviews/review-kuat-nv-rack/; 27 Pages; Dated Oct. 2, 2014.

*Primary Examiner* — Adam Waggenspack
(74) *Attorney, Agent, or Firm* — Lowe Graham Jones PLLC

(57) ABSTRACT

A retaining device for securing one or more accessory racks to a base rack on a vehicle is provided herein. The device comprises a housing member that extends through the one or more accessory racks and into the base rack, a head, secured to the housing member that engages one or other of the racks, a detent that engages the other of the racks, and an engagement mechanism that extends the detent and pulls it toward the head. The device may further comprise a lock that secures the detent in a clamping position. The lock may comprise a ratchet and pawl arrangement defined by first and second levered tabs disposed on the head, the first tab being operably connected to the engagement mechanism. An ATV comprising one or more accessory racks secured to a base rack by a retaining device as described herein is also provided.

12 Claims, 9 Drawing Sheets

(56) References Cited

U.S. PATENT DOCUMENTS

| | | | |
|---|---|---|---|
| 3,709,088 A * | 1/1973 | Pitzer | F16B 19/1063 |
| | | | 411/354 |
| 3,776,353 A | 12/1973 | Roth | |
| 4,086,014 A * | 4/1978 | Jalaguier | F16B 21/125 |
| | | | 24/453 |
| 4,451,057 A | 5/1984 | Lawson | |
| 4,563,038 A | 1/1986 | Hirose | |
| 4,614,252 A | 9/1986 | Tarner | |
| 4,664,208 A | 5/1987 | Horiuchi | |
| 5,036,939 A | 8/1991 | Johnson | |
| 5,186,772 A | 2/1993 | Nakasaki | |
| 5,305,502 A * | 4/1994 | Abrahams | A41F 1/00 |
| | | | 24/517 |
| 5,314,239 A | 5/1994 | Edwards | |
| 5,588,573 A | 12/1996 | Mann | |
| 5,662,451 A | 9/1997 | Muzzi | |
| 5,697,671 A | 12/1997 | Shavitz | |
| 5,765,917 A | 6/1998 | Johnson | |
| 5,845,918 A | 12/1998 | Grinde | |
| 5,876,147 A | 3/1999 | Longo | |
| 6,073,719 A | 6/2000 | Ohmika | |
| 6,241,301 B1 | 6/2001 | Speth | |
| 6,270,106 B1 | 8/2001 | Maki | |
| 6,378,748 B1 | 4/2002 | Cox | |
| 6,461,095 B1 | 10/2002 | Puska | |
| 6,491,124 B1 | 12/2002 | Thompson | |
| 6,502,728 B2 | 1/2003 | Savant | |
| 6,508,511 B1 | 1/2003 | Kolpin | |
| 6,626,748 B2 | 9/2003 | Homer | |
| 6,672,916 B1 | 1/2004 | Lent-Phillips | |
| 6,793,108 B2 | 9/2004 | Williams | |
| 7,044,526 B2 | 5/2006 | Tweet | |
| 7,165,702 B1 | 1/2007 | Billberg | |
| 7,156,593 B1 | 6/2007 | Saward et al. | |
| 7,377,570 B2 | 5/2008 | Rondeau | |
| 7,743,864 B2 | 6/2010 | Tweet | |
| 7,854,460 B2 | 12/2010 | Tweet | |
| 8,056,436 B2 | 11/2011 | Marable et al. | |
| 8,591,160 B2 * | 11/2013 | Shinozaki | F16B 5/0628 |
| | | | 24/458 |
| 9,168,875 B2 * | 10/2015 | Haler | B60R 9/06 |
| 2003/0230607 A1 | 12/2003 | Tweet | |
| 2009/0189381 A1 | 7/2009 | Kirtland | |
| 2013/0200121 A1 | 8/2013 | Hubbard | |

FOREIGN PATENT DOCUMENTS

| | | |
|---|---|---|
| EP | 1442940 A1 | 4/2004 |
| EP | 1634773 A1 | 3/2006 |
| EP | 2301806 A1 | 3/2011 |
| GB | 2339414 A | 1/2000 |
| WO | 9519897 A1 | 7/1995 |
| WO | 9620865 A1 | 7/1996 |

* cited by examiner

RETAINING DEVICE FOR VEHICLE RACKS

FIELD OF THE INVENTION

The invention relates generally to mechanisms for securing receiver racks to vehicles, and more particularly to securing accessory racks to a vehicle having a base rack.

BACKGROUND OF THE INVENTION

Personal recreational vehicles, such as all-terrain vehicles (ATVs), have grown in popularity, both for utilitarian and recreational purposes. ATVs are now employed for a variety of uses, ranging from hunting to recreational transport to enabling work projects in otherwise difficult-to-reach locations. Accordingly, ATVs are often used to carry such wide-ranging items as tool sets, hay or brush bundles, coolers, firearms, or other hunting implements, grills, milk crates, and the like. Corresponding to the breadth of tasks and uses to be pursued, ATV users may require a single ATV to transport diverse forms of cargo.

Previously, little provision was made for carrying and securing items to ATVs. Ad hoc fastening by ropes, tethers, bungee cords, and straps offers imperfect, time-consuming, and often frustrating solutions. To this end, efforts have been made to improve the carrying scheme of an ATV. For example, U.S. Pat. No. 7,044,526 B2 to Tweet et al. provides a sectional receiver rack comprised of a main framework piece to be mounted to a recreational vehicle and auxiliary frame rack pieces that may be reversibly coupled to the main framework to form a cargo-carrying unit.

However, the ability of an ATV to carry objects of varying size and shape remains to be improved. Modular solutions, such as interchangeable rack extensions, rack rails, and accessory racks that are supplementary to a base rack, provide for increased versatility in this regard and maximize rack carrying capacity. A crucial element to these improved systems is easy and efficient attachment and removal of varying rack extension components. Traditional securing mechanisms, such as screws, cotter pins, flange-and-recess systems, and the like may not be easily or quickly manipulated to reversibly and reliably secure one or more accessory racks to a vehicle base rack. Therefore, an alternative device is needed for easily, reversibly, and reliably securing accessory racks to base racks on vehicles.

SUMMARY OF THE INVENTION

Against this backdrop, the present invention has been created. A retaining device for reversibly securing one or more accessory racks to a base rack on an ATV includes a housing member shaped to pass through an accessory rack and into a recess of the base rack, a head, secured to the housing member, shaped to engage one or other of the racks, a detent that engages the other of the racks, and an engagement mechanism that extends the detent and pulls it toward the head. The detent may comprise at least one retaining arm, and preferably comprises two retaining arms.

The retaining device may further comprise a lock that secures the detent in a clamping position; preferably, the lock is a ratchet-and-pawl arrangement, wherein the ratchet is defined along a surface of a first tab and the pawl is defined along a surface of the second tab, the first and second tabs being disposed along the head. The first tab defines a first lever opposite the ratchet and the second tab defines a second lever opposite the pawl.

The engaging mechanism is operably connected to the first tab. Downward action of the first lever raises the engagement mechanism, thereby extending the detent and engaging the lock, while subsequent downward action of the second lever releases the lock, thereby releasing the engagement mechanism downward and withdrawing the detent, thereby permitting removal of the retaining device and, optionally, the one or more accessory racks from the base rack.

In one embodiment of the present invention, a retaining device includes an engaging mechanism, as well as a head, housing member, and first and second tabs as previously described. In this embodiment, the engaging mechanism comprises a steel spring clip, the spring clip being disposed around a cylindrical pin that is fixed in the housing member. An appropriate steel spring clip may be purchased, for example, from Bresco Vehicle Services Limited (http://www.bresco.com). The spring clip includes retaining arms to form a detent and also includes elongated tip, the elongated tip operably connecting the spring clip to the first tab.

When the spring clip is in a resting state, the regions of the spring clip that define the retaining arms are in close proximity and may be in contact with one another. Downward action of the first lever engages the lock and raises the spring clip up the housing member, drawing the retaining arms apart to travel over opposing curved surfaces of the cylindrical pin. The width of the cylindrical pin causes each of the retaining arms to extend through a different housing member aperture and toward the head, forming a clamp with the head. Downward action of the second lever disengages the lock, driving the spring clip down and returning the retaining arms back over the curved surface of the cylindrical pin to a resting position inside the housing member. This action withdraws the detent and disengages the clamp, permitting removal of the retaining device and of the one or more accessory racks.

In a second embodiment of the present invention, a retaining device includes an engaging mechanism, as well as a head, a housing member comprising sidewalls which define a plurality of apertures, and first and second tabs as previously described. In this embodiment, the engaging mechanism assembly comprises a pin, spring-governed retaining arms rotatably connected to the pin, and a shaft. The shaft operably connects the pin to the first tab. Upward travel of the engaging mechanism raises the retaining arms above a lower portion of the housing member sidewall to encounter diametrically-opposed housing member apertures. Spring force biases the retaining arms to protrude through the housing member apertures and to form a detent and a clamp as described previously. Downward travel of the engaging mechanism releases the detent and clamp, causing the retaining arms to re-encounter the lower portion of the housing member sidewall. The housing member sidewall forces the retaining arms to rotate inward about the pin and against spring bias as the engaging mechanism continues downward travel. The retaining arms thereby retreat within the periphery of the housing member, permitting removal of the retaining device and, optionally, the one or more accessory racks from the base rack.

In another embodiment of the present invention, an ATV having a base rack is reversibly secured to one or more accessory racks by use of a retaining device as previously described. The retaining device includes a head and a housing member and is operable by levered tabs to raise and lower and engagement mechanism that forms at least one detent. Spring-governed lever action of the first and second tabs reversibly engages a ratchet-and-pawl arrangement as previously described and governs upward or downward motion of the engaging mechanism. Raising and lowering the engaging mechanism allows for reversible formation of a clamp as previously described to quickly and reversibly secure one or more accessory racks rack to the base rack of the ATV.

BRIEF DESCRIPTION OF THE DRAWINGS

Preferred and alternative examples of the present invention are described in detail below with reference to the following drawings.

DETAILED DESCRIPTION OF THE PREFERRED EMBODIMENTS

Figure 1:
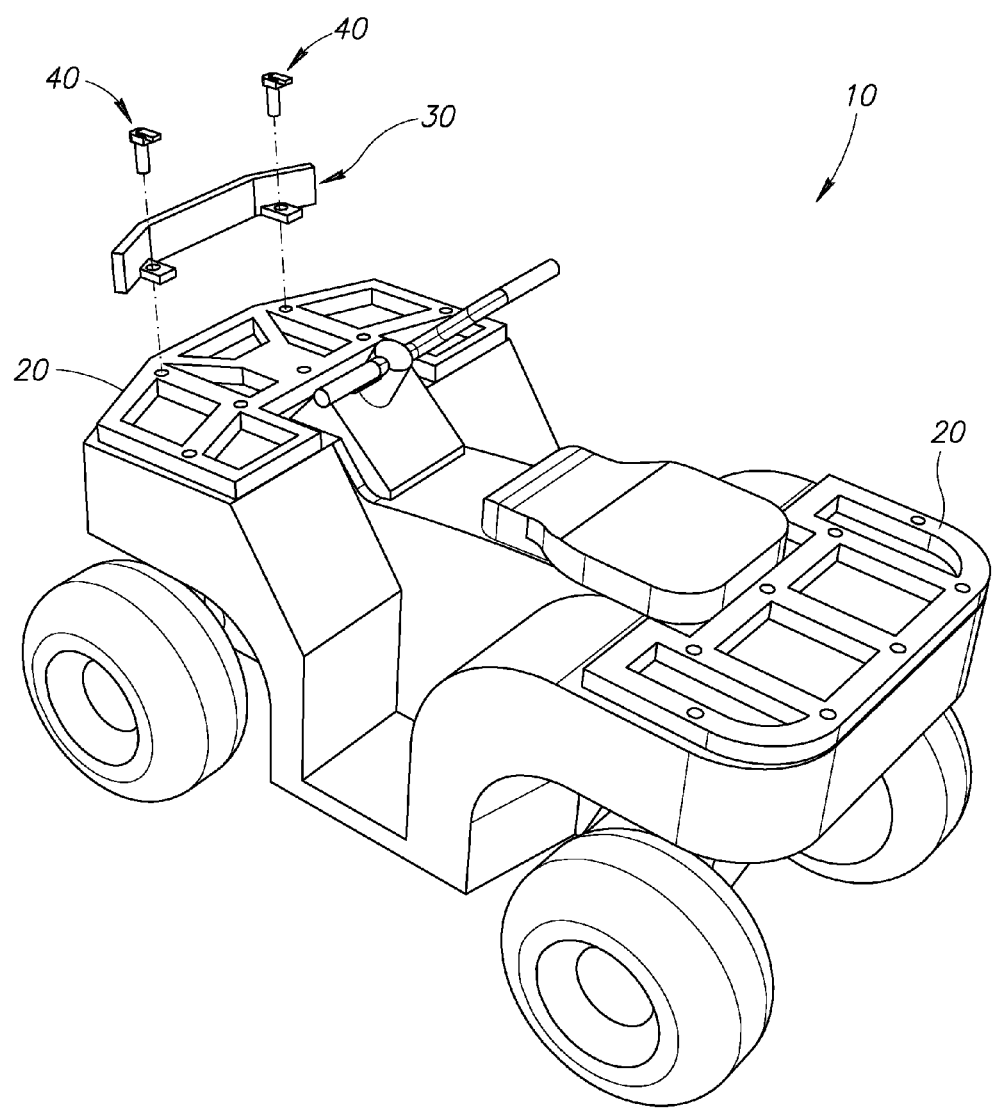
FIG. 1 is a rear perspective view of an ATV of the present invention.

The problem of easily and reversibly securing a secondary rack attachment to a base rack of a personal recreational vehicle (such as an ATV) may be solved by utilization of a retaining device. A retaining device includes an engaging mechanism defining a plurality of retaining arms, each of which can function as a detent. The engaging mechanism is disposed within a housing member, the housing member being adapted to pass through one or more securing apertures defined by an accessory rack and into a base rack recess. The housing member is connected to a head, the head being adapted to rest on an upper surface of an accessory rack without passing through a securing aperture defined by said accessory rack. A pair of tabs are disposed along the head (hereinafter, the "first tab" and "second tab"), the first of which connects to the engaging mechanism at a point distal to the plurality of retaining arms. The first tab defines a plurality of ratcheting teeth and the second tab defines a pawl, the first and second tabs being disposed along the head so as to form a reversibly-engagable ratchet-and-pawl arrangement. The first tab further defines a first lever opposite the plurality of ratcheting teeth and the second tab further defines a second lever opposite the pawl. The action of each lever is governed by a separate torsion spring. When engaged, the ratchet and pawl arrangement forms a lock preventing downward travel of the first tab and the engaging mechanism.

Downward action of the first lever causes the engaging mechanism to travel up the housing member and engages the lock to prevent downward travel of the engaging mechanism. Upward travel of the engaging mechanism causes the retaining arms to encounter and extend through a pair of diametrically-opposed apertures defined along the housing member sidewalls. At a point of maximal upward travel, each of the retaining arms encounters and forms a detent against the base rack. The detents function with the head of the retaining device to form a clamp, thereby securing the at least one accessory rack to the base rack.

Downward action of the second lever disengages the lock. Spring bias returns the first tab to a default position and drives the engaging mechanism down the housing member, thereby withdrawing the retaining arms from the base rack and into the housing member. In this way, removal of the retaining device and of the now-unsecured one or more accessory racks is permitted.

It will be appreciated that the retaining device of the present invention may be of any appropriate length and/or construction to secure a desired number and/or style of accessory racks to a base rack. For example, the housing member may be long enough to pass through securing apertures in one, or two, or three, or more accessory racks. Further, the housing member may assume any shape that is appropriate to passage through the one or more securing apertures of the one or more accessory racks to be secured and into a corresponding base rack recess. For example, the housing member may be cylindrical, or cone-shaped, or it may be polygonal in cross-section. In a preferred embodiment, the housing member is octagonal in cross-section. Still further, the materials comprising the retaining device of the present invention may be selected for advantageous properties of weight, manufacturing cost, or tolerance, depending on, among other things, the type of accessory rack and/or cargo to be secured thereby. In certain embodiments, the retaining device is manufactured from metals possessing appropriate properties. In preferred embodiments, components of the retaining device are manufactured from aluminum, while other components are made of spring steel. Alternatively, the components may be constructed of plastics or composites.

Although the retaining device described herein may be used with any personal recreation vehicle (recreational off-highway vehicle or UTV, all-terrain vehicle, motorcycle, snowmobile, automobile, boat, etc.) with a compatible rack system, the remaining passages describe the receiver rack as it relates to all-terrain vehicles (ATVs). As used herein, the term "ATV" refers to straddle-mounted vehicles that are driven by four or more wheels.

FIG. 1 depicts an ATV 10 in a semi-schematic view with front and rear base racks 20. The ATV 10 is outfitted with an accessory rack 30, which is secured to the base rack 20 by use of retaining devices 40. Each of the retaining devices 40 comprises a housing member, described further herein, which passes through a securing aperture defined by an accessory rack 30 to rest in a recess defined in the base rack 20. A head portion of the retaining device 40, described further herein, rests on the accessory rack. A pair of tabs (not pictured) disposed on the head portion govern motion of an engaging mechanism disposed along the shaft to form a releasable clamp and thereby secure the accessory rack 30 to the base rack 20, as is described further herein. Examples of accessory racks 30 that may be reversibly secured to the base rack 20 include, but are not limited to, rack height extensions, rack rails, and a variety of other racks to accommodate transport of such varied cargo as camping supplies, toolbags, toolkits, firearms, coolers, grills, large tools, hay bales, and brush.

The above-described scheme possesses a number of advantages. First, the scheme permits reliable securing of the accessory rack 30 to the base rack 20. Second, the scheme permits fast, efficient securing or release of a range of accessory racks 30 to the base rack 20. Details regarding the construction of ATVs 10 are known in the art and therefore need not be discussed herein.

Figure 2:
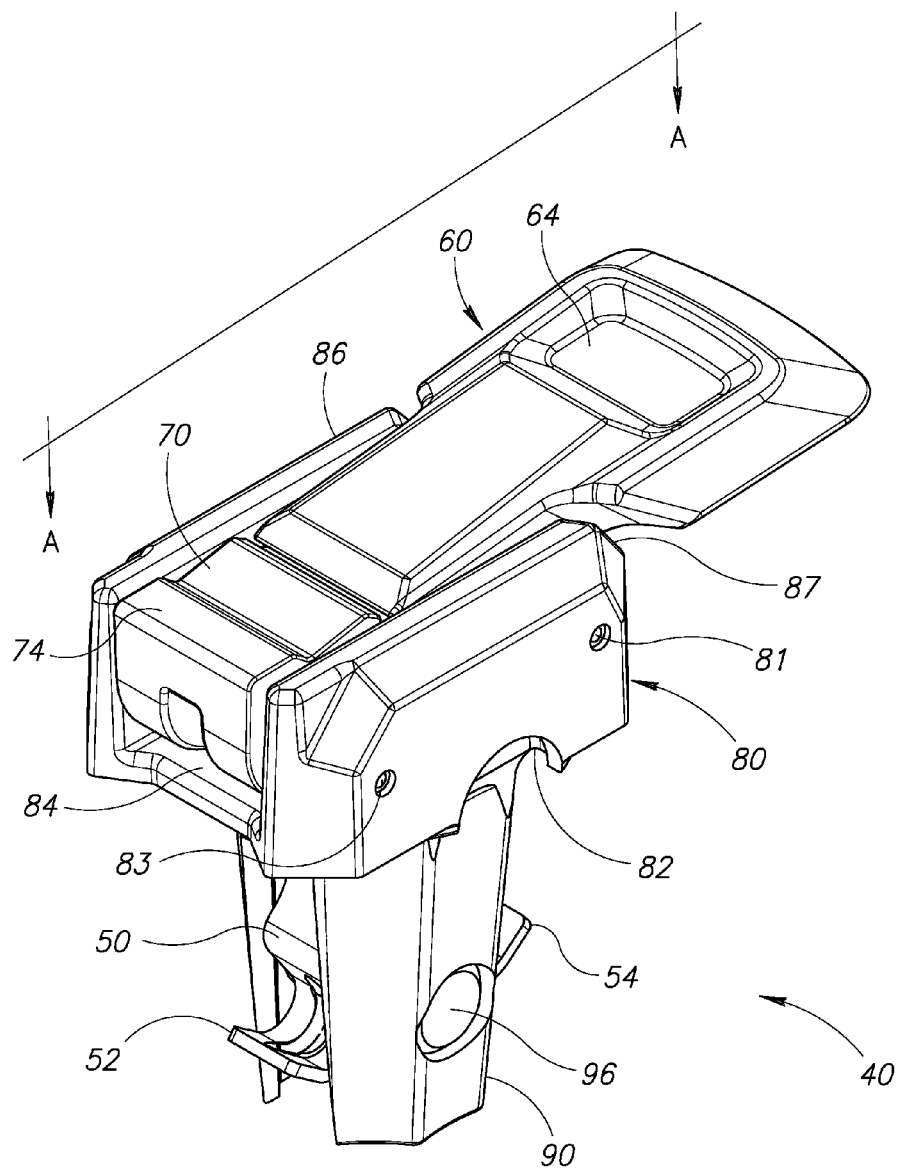
FIG. 2 is a front isometric view of a first embodiment of the retaining device of the present invention.

FIG. 2 depicts a first embodiment of a retaining device, generally indicated at 40, of the present invention, in a partially-engaged configuration. The retaining device comprises an engaging mechanism, partially hidden from view and housed within a housing member 90. The engaging mechanism comprises a spring clip 50 that comprises retaining arms 52 and 54 capable of extending through housing member apertures 92 and 94 (not shown), respectively. The spring clip 50 is disposed around a cylindrical pin 96 that is itself disposed within the housing member 90. The spring clip 50 is further pivotally connected to a first tab 60, which defines a plurality of ratcheting teeth (not shown) along an inner region and a first lever 64 along an outer region. A second tab 70 defines a second lever 74 along an outer region and a pawl (not shown) along an inner region for engaging with the plurality of ratchet teeth to form a ratchet-and-pawl arrangement. The first and second tabs 60 and 70 are disposed on a head 80, which comprises raised headwalls 86 and 87, a trough surface 84, and a bottom surface 82 for securing an accessory rack. The housing member 90, comprising a plurality of sidewalls, is attached to the head 80 and extends longitudinally therefrom around the engaging mechanism. The head 80 and housing member 90 can be integral or can be formed separately and attached or coupled to one another.

Figure 3:
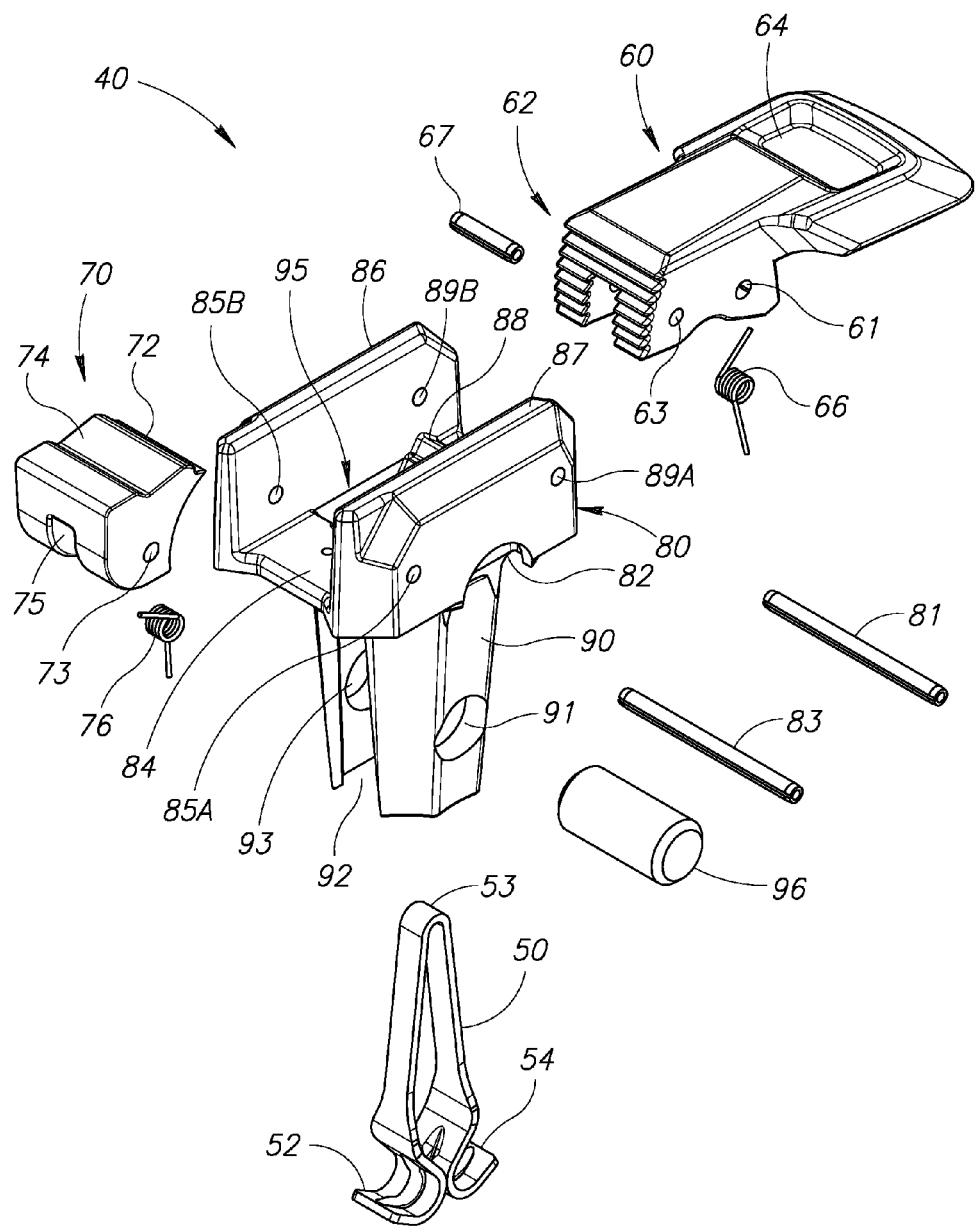
FIG. 3 is an exploded front isometric view of the retaining device of FIG. 2.

The components and working mechanisms of this first embodiment of the invention are shown more fully by way of an exploded view provided in FIG. 3. An engaging mechanism comprises a spring clip 50 comprising retaining arms 52 and 54 and a tip 53. The spring clip 50 is disposed around the cylindrical pin 96, which is disposed across the housing member 90 and rests in housing member apertures 91 and 93. The spring clip 50 is pivotally secured to a first tab 60 by pivot rod 67, which passes through tab aperture 63 and provides a hanging surface for the tip 53.

The first tab 60 comprises an inner region and an outer region, the inner region defining a plurality of ratcheting teeth 62 and the outer region defining a first lever 64. The second tab 70 comprises an inner region and an outer region, the inner region defining a pawl 72 in sufficient proximity for engaging the ratcheting teeth 62 of the first tab 60 and the outer region defining a second lever 74. The first and second tabs 60 and 70 are disposed within a trough defined along the head 80 by a trough surface 84 and raised headwalls 86 and 87. The trough surface 84 further defines a brake element 88 and still further defines an aperture 95 to the housing member 90, through which the tip 53 passes to pivotally connect to the first tab 60.

Lever motion of the first and second tabs 60 and 70 is governed by torsion springs 66 and 76, respectively. The first and second tabs 60 and 70 are held in place by securing rods 81 and 83, respectively, in the following way: securing rod 81 is inserted between head aperture 89A, first tab aperture 61 and head aperture 89B, while securing rod 83 is inserted between head aperture 85A, second tab aperture 73, second tab recess 75 and head aperture 85B. The torsion spring 76 is disposed about securing rod 83 within tab recess 75.

Figure 4:
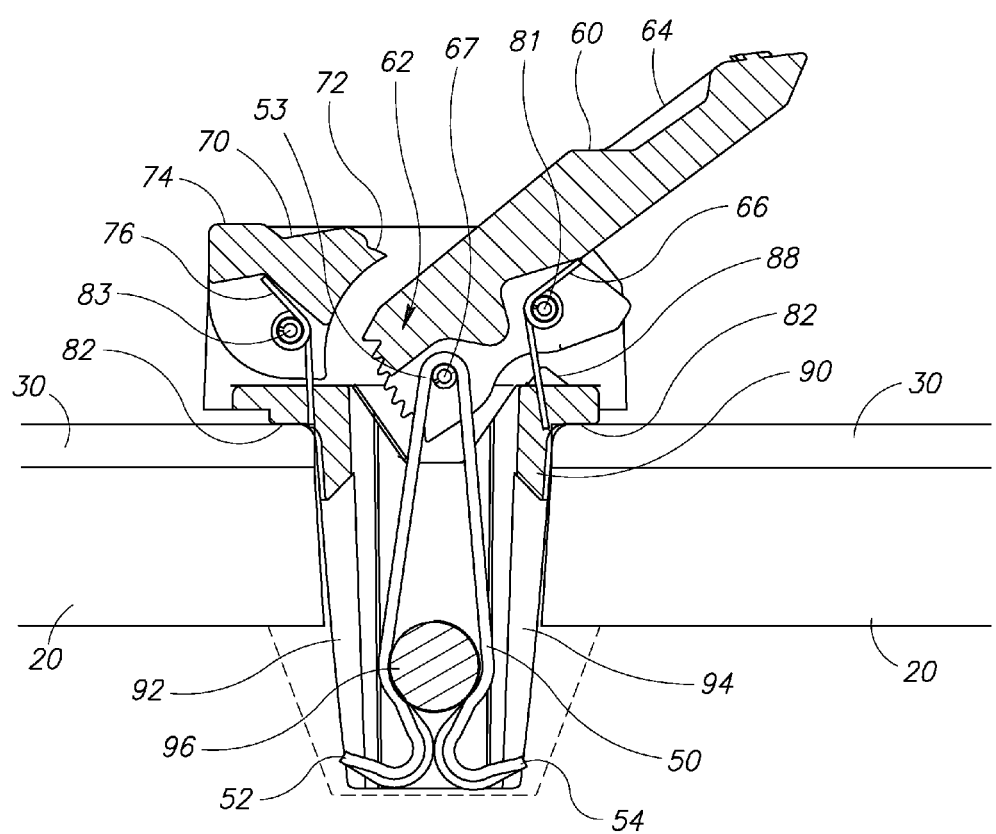
FIG. 4 is a sectional view of the retaining device of FIG. 2 in an unengaged configuration, taken along line A-A of FIG. 2 and depicting the retaining device inserted through a securing aperture defined by an accessory rack and into a recess defined in a base rack of an ATV.

FIG. 4 depicts a sectional view, taken along line A-A of FIG. 2, of the retaining device inserted through an aperture in an accessory rack 30 and into a recess (dashed lines) in base rack 20. In FIG. 4, the retaining device is depicted in an unengaged configuration, with the ratchet-end of the first tab 60 oriented downwards due to bias from torsion spring 66. Accordingly, the spring clip 50 assumes a lowered position down the housing member 90, distal to the head. In this unengaged configuration, the retaining arms 52 and 54 reside in close proximity to one another below the cylindrical pin 96 due to the natural bias of the spring clip 50. It will be appreciated that the proximity of the retaining arms 52 and 54 in this configuration, and, indeed, the specific bias and tensile strength of the spring clip 50, may vary without departing from the true scope and spirit of the invention.

Figure 5:
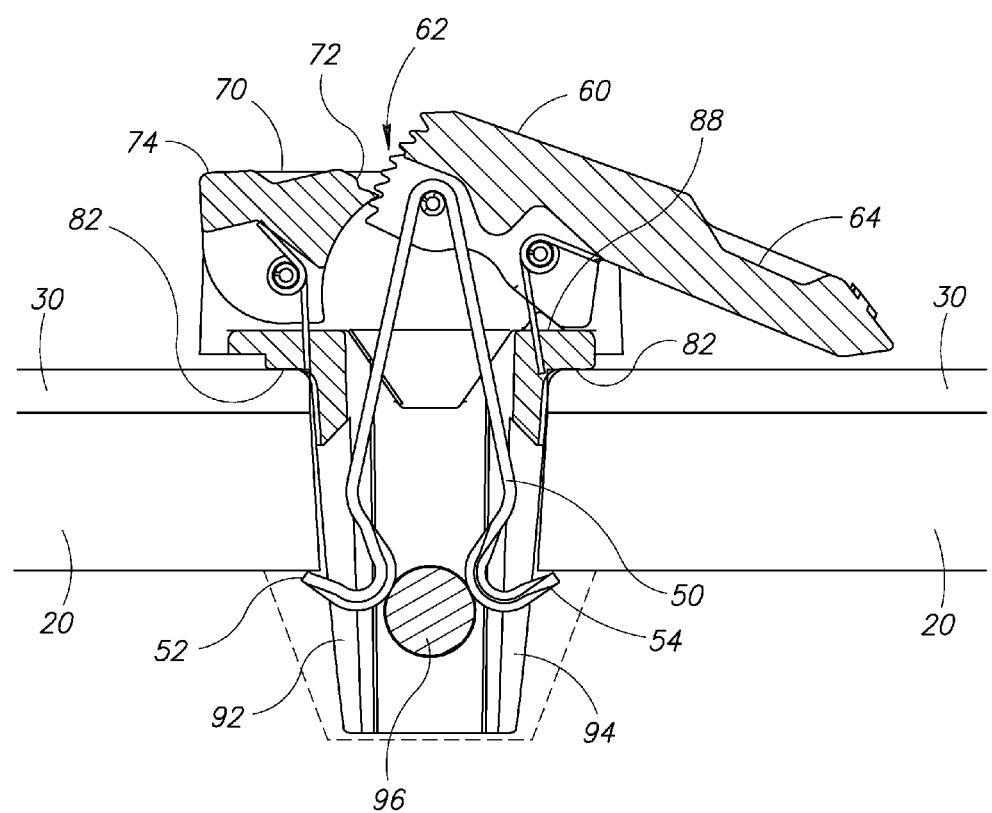
FIG. 5 recapitulates the sectional view of FIG. 4, the retaining device now being in a fully engaged configuration.

FIG. 5 depicts a sectional view, also taken along line A-A of FIG. 2, of the retaining device inserted through a securing aperture defined by the accessory rack 30 and into a recess (dashed lines) defined in the base rack 20. In FIG. 5, the retaining device is depicted in a fully engaged configuration, with the ratchet end of the first tab 60 oriented upwards. This fully engaged configuration is achieved by downward action of the first lever 64 against torsion spring bias. As the ratchet end of the first tab 60 orients upward, the plurality of ratcheting teeth 62 engage the pawl 72 and the spring clip 50 is raised toward the head. As the spring clip 50 rises, the retaining arms 52 and 54 separate against the bias of the spring clip 50 to travel over opposing sides of the cylindrical pin 96. The width of the cylindrical pin 96 forces the retaining arms 52 and 54 to extend through housing member apertures 92 and 94, respectively. At or near a point of maximal extension through the housing member apertures 92 and 94, each of the retaining arms 52 and 54 encounters the lower surface of the base rack 20 and forms a detent to prevent further upward travel of the spring clip 50. It will be noted that the base rack 20 is tapered inward to provide an improved purchasing surface for the retaining arms 52 and 54. Further downward travel of the first lever 64 is limited by the brake element 88.

The detents formed by the retaining arms 52 and 54 against the bottom rack 20 create a clamp with the head bottom surface 82, which rests on the upper surface of the accessory rack 30, to secure the accessory rack 30 to the base rack 20. Force from the cylindrical pin 96 against the spring clip 50 prevents release of the retaining arms 52 and 54 from the base rack 20. The pawl 72 prevents downward release of the first tab 60 and maintains clamp tension on the accessory rack 30 and the base rack 20. In a locked configuration, the retaining arms 52 and 54 are flexed against the base rack 20 due to the upward pull of the first tab 60, causing tension in the spring clip 50. Downward action of the second lever 74 raises the second tab 70 to disengage the pawl 72 from the plurality of ratcheting teeth 62, releasing the first tab 60 and the spring clip 50. The spring clip 50, in turn, moves downwardly, withdrawing the retaining arms 52 and 54 from the base rack 20 and into the housing member, as is depicted in FIG. 4, permitting the ratchet end of the first tab 60 to re-orient downward. Downward re-orientation of the ratchet end of the first tab 60 may be accomplished entirely by return of the torsion spring 66 to an unbiased configuration and tension-directed release of the spring clip 50 away from the lower rack 20, or may be assisted by a user pulling upwards on the first lever 64. When the retaining arms 52 and 54 have withdrawn into the housing member, the retaining device 40 and the accessory rack 30 may be easily removed and, if desired, an accessory rack of alternative design may then be secured to the base rack by use of the retaining device.

Figure 6:
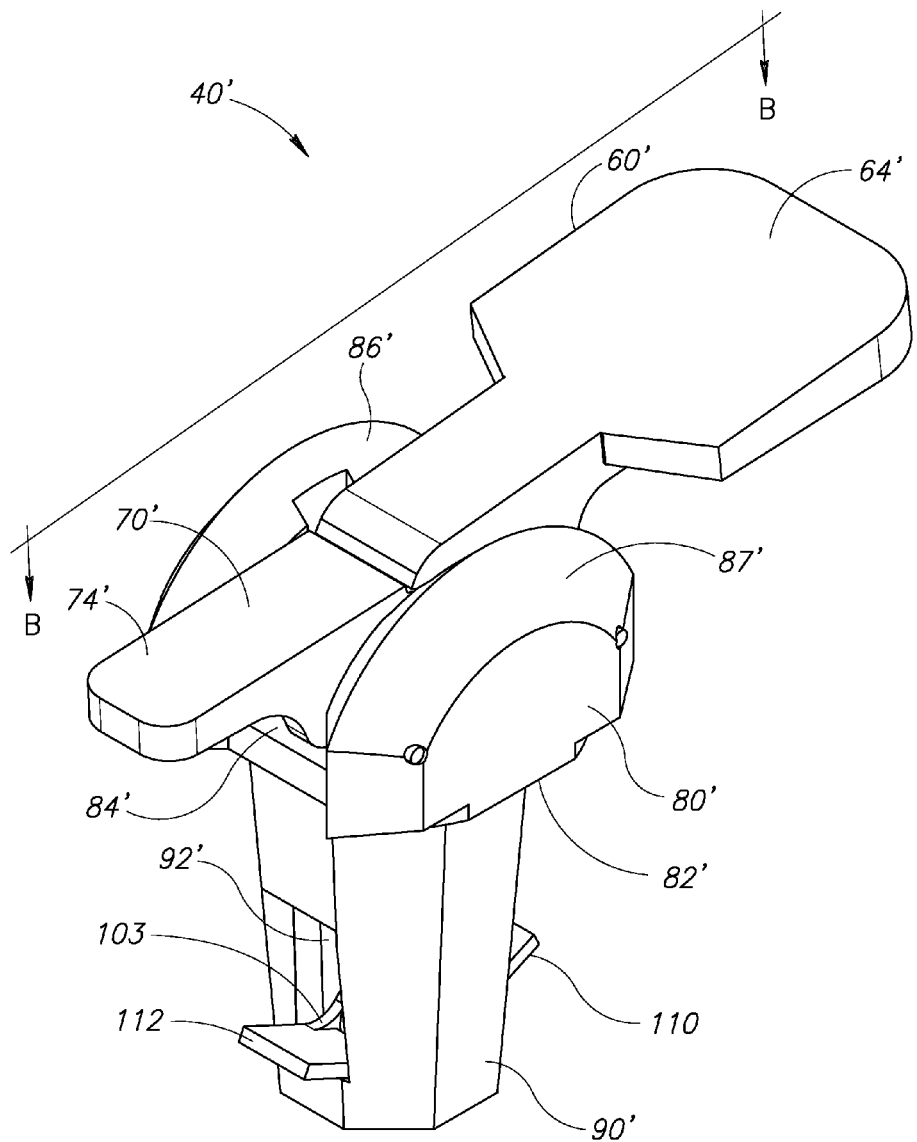
FIG. 6 is a front isometric view of a second embodiment of the retaining device of the present invention in a partially engaged configuration.

FIG. 6 depicts a second embodiment of the retaining device of the present invention, generally indicated at 40', in a partially engaged configuration. The retaining device 40' comprises a multi-component engaging mechanism, partially hidden from view and housed within a housing member 90'. Visible in FIG. 6 are retaining arms 110 and 112, which are extendable through housing sidewall apertures 94' (not shown) and 92', respectively, under force from torsion spring 103.

The engaging mechanism is pivotally connected to a first tab 60', which defines a plurality of ratcheting teeth (not shown) along an inner region and a first lever 64' along an outer region. A second tab 70' defines a second lever 74' along an outer region and a pawl (not shown) along an inner region for engaging with the plurality of ratchet teeth to form a ratchet-and-pawl arrangement. The first and second tabs 60' and 70' are disposed on a head 80', which comprises raised headwalls 86', 87', a trough surface 84', and a bottom surface 82' adapted for securing an accessory rack. The housing member 90' is attached to the head 80' and extends longitudinally therefrom around the engaging mechanism.

Figure 7:
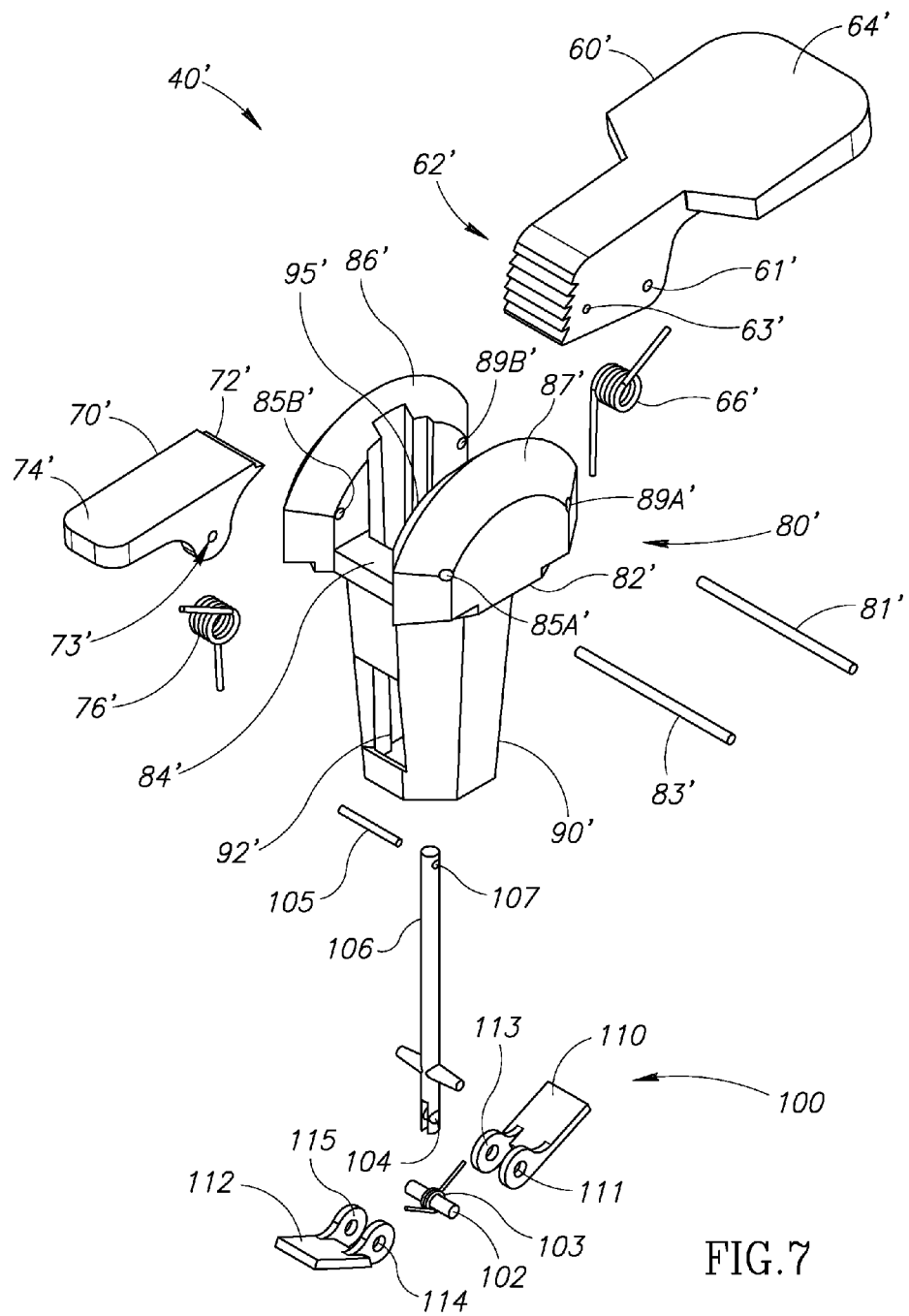
FIG. 7 is an exploded front isometric view of the retaining device of FIG. 6.

The components and working mechanisms of this first embodiment of the invention are shown more fully by way of an exploded view provided in FIG. 7. The engaging mechanism, generally indicated at 100, comprises a pin 102, a torsion spring 103, a shaft 106, a pivot rod 105, and retaining arms 110 and 112. The pin 102 connects the components of the engaging mechanism by insertion through retaining arm apertures 111, 113, 114 and 115 and into a lower shaft aperture 104 defined along the lower end of the shaft 106. Retaining arms 110 and 112 are thus rotatably disposed around the pin 102. Also disposed around the pin 102 is the torsion spring 103, which contacts each of the retaining arms 110 and 112 to regulate rotation thereof around the pin 102.

The shaft 106 is pivotally secured at its upper end to a first spring-regulated tab 60' by pivot rod 105, which passes through upper shaft aperture 107 and into tab aperture 63'. The first tab 60' comprises an inner region and an outer region, the inner region defining a plurality of ratcheting teeth generally indicated at 62' and the outer region defining a first lever 64'. A second tab 70' comprises an inner region and an outer region, the inner region defining a pawl 72' for engaging the ratcheting teeth 62' of the first tab 60' and the outer-region defining a second lever 74'.

The first and second tabs 60' and 70' are disposed within a trough defined along the head 80' by trough surface 84' and raised headwalls 86' and 87'. The trough surface 84' further defines an opening 95' to the housing member 90', through which the shaft 106 of the retaining member passes to pivotally connect to the first tab 60'. Movement of the first and second tabs 60' and 70' is governed by torsion springs 66' and 76', respectively, also disposed along the trough surface 84'. The first and second tabs 60' and 70' are held in place by securing rods 81' and 83', respectively. Securing rod 81' is inserted between head aperture 89A', tab aperture 61' and head aperture 89B' to secure the first tab 60' to the head 80'. Securing rod 83' is inserted between head aperture 85A', tab aperture 73' and head aperture 85B' to secure the second tab 70' to the head 80'.

Figure 8:
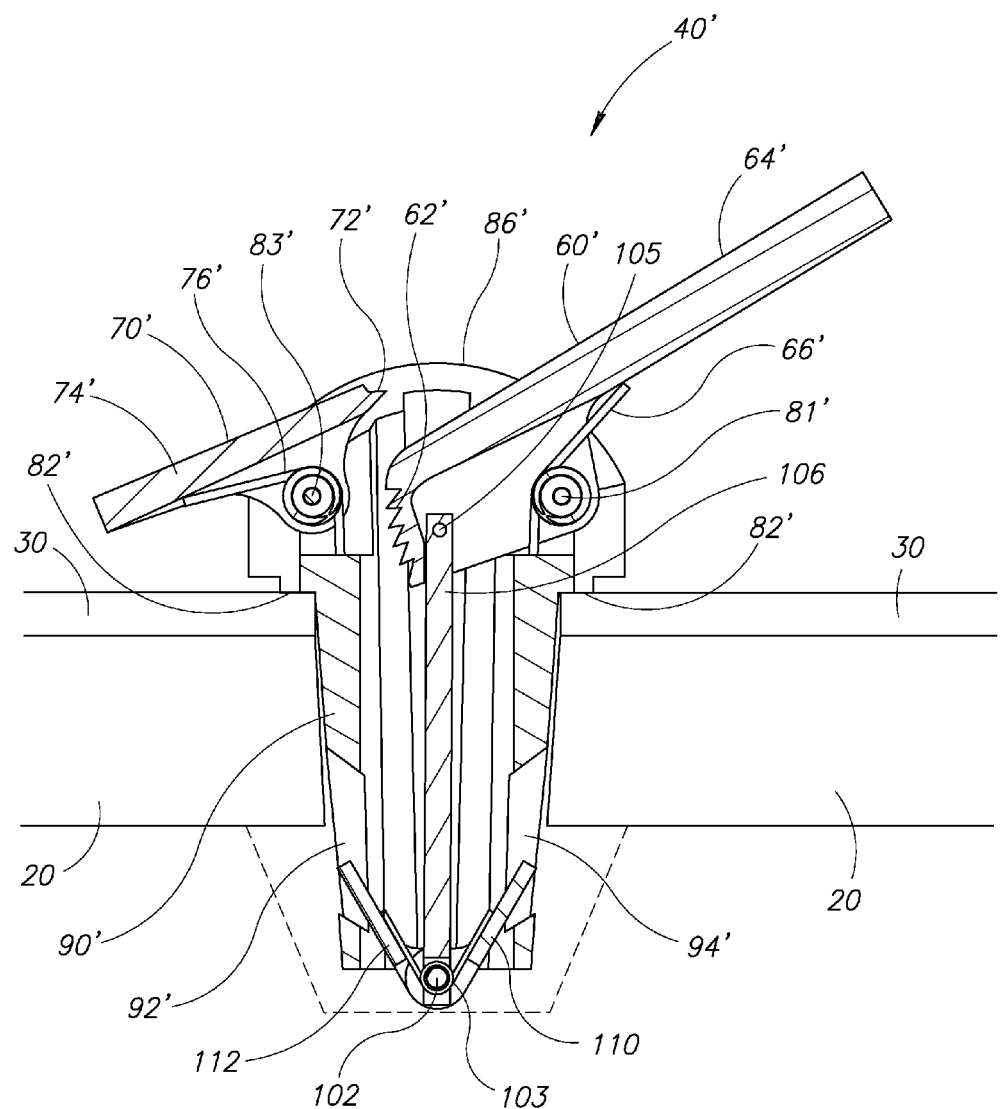
FIG. 8 is a sectional view of the retaining device of FIG. 6 in an unengaged configuration, taken along line B-B of FIG. 6 and depicting the retaining device inserted through a securing aperture defined by an accessory rack and into a recess defined in a base rack of an ATV.
Figure 9:
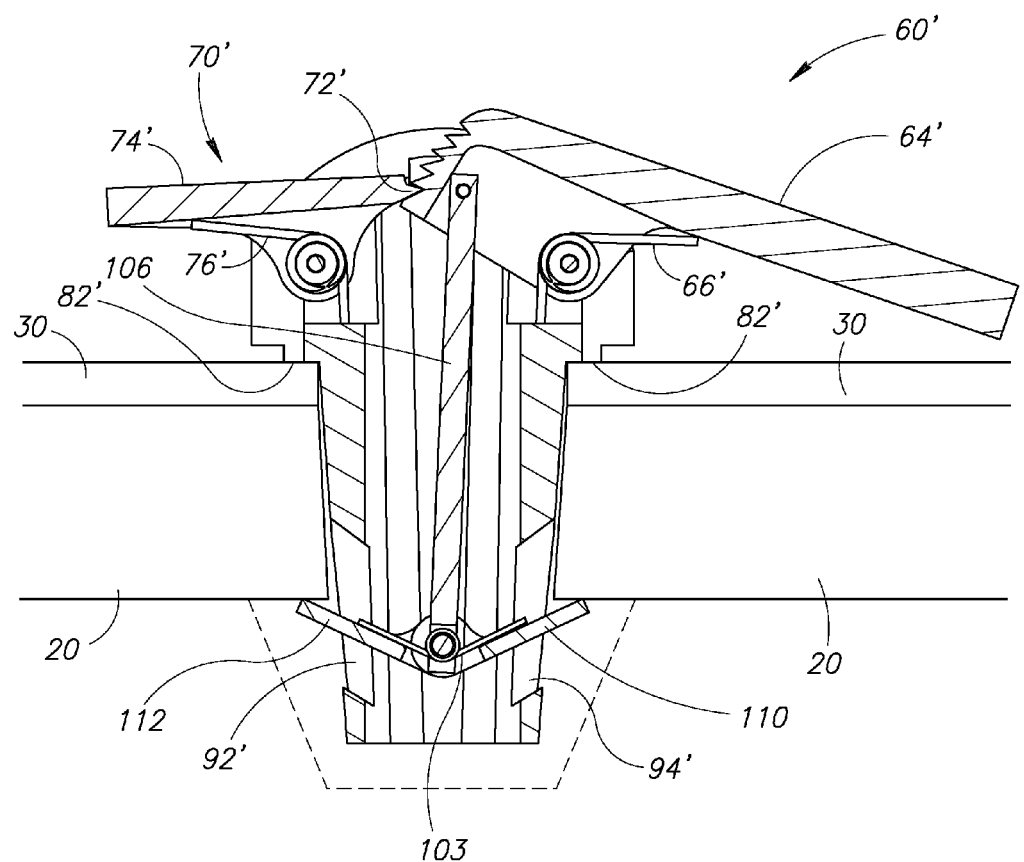
FIG. 9 recapitulates the sectional view of FIG. 8, the retaining device now being in a fully engaged configuration.

The mechanics of this second embodiment for securing an accessory rack to a base rack are shown in FIGS. 8 and 9. FIG. 8 depicts a sectional view, taken along line B-B of FIG. 6, of the retaining device 40' inserted through a securing aperture defined by an accessory rack 30 and into a recess (dashed lines) defined in base rack 20. The retaining device 40' is shown in an "unengaged" configuration, with the ratchet end of the first tab 60' oriented downwards due to bias from torsion spring 66'. Accordingly, the engaging mechanism assumes a position down the housing member 90'. In this unengaged configuration, the retaining arms 110 and 112 are forced inward by lower sidewall portions of the housing 90', rotating about the pin 102 and compressing the torsion spring 103. While the head bottom surface 82' is in contact with the upper surface of the accessory rack 30, no clamp is formed to secure the accessory rack 30 to the base rack 20 because the retaining arms 110 and 112 are not in contact with the base rack 20.

It will be noted that the pawl end of the second tab 70' is oriented upward in FIG. 8. This orientation, achieved by downward action of second lever 74', permits the first tab 60' to release downwards from an engaged configuration of the retaining device 40'. However, the default orientation of the second tab 70', consistent with spring bias from torsion spring 76', is more accurately depicted in FIG. 6, even when the first lever 64' is oriented as shown in FIG. 8.

FIG. 9 depicts a sectional view, taken along line B-B of FIG. 6, of this second embodiment of the retaining device inserted through a securing aperture defined by the accessory rack 30 and into a recess (dashed lines) defined in the base rack 20. In FIG. 9, the retaining device is depicted in an "engaged" configuration, with the ratchet end of the first tab 60' oriented upwards. This engaged configuration is achieved by downward action of the first lever 64' against bias from the torsion spring 66'. As the ratchet end of the first tab 60' orients upward, the pawl 72' of the second tab 70' is engaged to form a ratchet-and-pawl arrangement and the engaging mechanism rises within the housing member 90'. As the engaging mechanism rises, the retaining arms 110 and 112 clear the lower sidewall portions of the housing member 90' to encounter housing member apertures 94' and 92', respectively. The torsion spring 103 is then able to relax, biasing the retaining arms 110 and 112 to extend and form a detent against a lower surface of the base rack 20, preventing further upward motion of the engaging mechanism. The detent formed by the retaining arms 110 and 112 creates a clamp with the head bottom surface 82' to secure the accessory rack 30 to the base rack 20. Each of the retaining arms 110 and 112 prevents further bias of the other retaining arm, as they balance each other about their common pivot and clamp to the base rack 20. It will again be noted that the base rack 20 is tapered inward to provide a purchasing surface for the retaining arms 110 and 112. The pawl 72' prevents downward release of the first tab 60' and maintains clamp tension on the accessory rack 30 and the base rack 20. Downward action of the second lever 74' raises the second tab 70' to disengage the pawl 72' from the plurality of ratcheting teeth 62', releasing the first tab 60' and the engaging mechanism downward and withdrawing the retaining arms from the base rack 20 into the housing member 90', as is depicted in FIG. 8. In this way, the retaining device 40' and, if desired, the accessory rack 30 may be easily removed.

Embodiments are further described by the following numbered paragraphs:

1. A retaining device for reversibly securing an accessory rack to a base rack, comprising:
   a housing member that extends through the accessory rack and the base rack;
   a head that is secured to the housing member, wherein the head is configured to engage one or other of the racks;

a detent that engages the other of the racks; and an engagement mechanism that is configured to extend the detent and pull the detent toward the head.

2. The retaining device of paragraph 1, wherein the detent comprises at least one retaining arm.

3. The retaining device of paragraph 2, further comprising a lock that secures the detent in a clamping position.

4. The retaining device of paragraph 3, wherein the lock is a ratchet-and-pawl arrangement.

5. The retaining device of paragraph 4, wherein the ratchet is defined along a surface of a first tab and the pawl is defined along a surface of a second tab, the first and second tabs being disposed along the head.

6. The retaining device of paragraph 5, wherein the first tab defines a first lever opposite the ratchet and the second tab defines a second lever opposite the pawl.

7. The retaining device of paragraph 6, wherein the housing member defines at least one aperture for extending the detent.

8. The device of paragraph 7, wherein the engagement mechanism is operably connected to the first tab, wherein the first lever is adapted to assume a downward configuration, whereupon the lock is engaged and the engagement mechanism assumes a raised configuration wherein the detent is extended, and wherein the second lever is adapted to assume a downward configuration, whereupon the lock is disengaged, whereby the engagement mechanism assumes a lowered conformation wherein the detent is withdrawn.

9. The device of paragraph 8 wherein the housing member is cylindrical.

10. The device of paragraph 8 wherein the housing member assumes a conical shape.

12. The device of paragraph 8 wherein the housing member is polygonal in cross-section.

13. The retaining device of paragraph 8, further comprising a cylindrical pin fixed in the housing member, wherein the housing member defines a plurality of apertures.

14. The retaining device of paragraph 13 wherein the engagement mechanism comprises a spring clip having a first end, a second end, and a middle portion, each of the first and second ends defining a retaining arm to form a detent and the middle portion forming an elongated tip, wherein the elongated tip is operably connected to the first tab and wherein the spring clip is disposed around the cylindrical pin.

15. The retaining device of paragraph 14 whereupon assumption of the raised configuration by the engagement mechanism each of the first and second ends assumes a raised position against the cylindrical pin, wherein each of the first and second ends is extended through a different aperture of the plurality of apertures and raised toward the head to create a clamp, and whereupon assumption of the downward configuration by the second lever the lock is disengaged and the spring clip assumes a lowered configuration wherein the retaining arms assume a resting position within the housing member and below the cylindrical pin.

16. The retaining device of paragraph 8, wherein the engagement mechanism further comprises a proximal portion and a distal portion and wherein the housing member comprises a pair of diametrically-opposed sidewalls, each sidewall of the pair defining at least one aperture therein.

17. The retaining device of paragraph 16 wherein the proximal portion comprises a shaft and the distal portion comprises a pin, a torsion spring, and a pair of retaining arms consistent with the pair of diametrically-opposed sidewalls, wherein each retaining arm of the pair of retaining arms is rotatably connected to the pin and wherein the torsion spring is disposed around the pin and is in contact with each arm of the pair of retaining arms, the shaft having an upper end pivotally connected to the first tab and a lower end secured to the pin.

18. The retaining device of paragraph 17, whereupon assumption of the raised configuration by the engagement mechanism the shaft assumes a raised position in the housing member wherein each retaining arm of the pair of retaining arms is extended through a different aperture to form a clamp, and whereupon assumption of the downward configuration by the second lever the lock is disengaged, whereupon the shaft assumes a lowered position in the housing member and the clamp is released, wherein each of the retaining arms is rotated inward about the pin and against the sidewall, thereby assuming a resting position within the housing member.

19. An ATV, comprising a base rack and at least one accessory rack, wherein the at least one accessory rack is reversibly secured to the base rack by the retaining device of paragraph 1.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A retaining device for reversibly securing a first and a second rack, comprising:
    a housing member having a longitude;
    a head secured to the housing member, wherein the head extends transverse to the longitude of the housing;
    a first tab connected to the head; and
    a detent connected to the first tab, the detent including two retaining arms positioned on opposing sides of an interior structure, the arms having an outwardly expanded position proximal to the head and a retracted position distal to the head,
    wherein the retaining arms have a portion that has concave curvature relative to the structure and another portion that has a convex curvature relative to the structure,
    wherein the convex curvature portions of the retaining arms contact the interior structure in the expanded position.

2. The retaining device of claim 1, further comprising a lock that secures the detent in a clamping configuration.

3. The retaining device of claim 2, wherein the lock comprises a ratchet and pawl.

4. The retaining device of claim 3, wherein the ratchet is defined along a surface of the first tab and the pawl is defined along a surface of a second tab, the first and second tabs being disposed along the head, and wherein the first tab defines a first lever opposite the ratchet and the second tab defines a second lever opposite the pawl.

5. The device of claim 1, wherein the first lever is adapted to assume a downward configuration, whereupon the lock is engaged and the detent assumes a raised configuration wherein the detent is extended, and wherein the second lever is adapted to assume a downward configuration, whereupon the lock is disengaged, whereby the detent assumes a lowered conformation wherein the detent is withdrawn.

6. The device of claim 1, wherein the housing member has a conical shape.

7. The retaining device of claim 1, further comprising a spring clip having a first end, a second end, and a middle portion, each of the first and second ends defining the retaining arms and the middle portion forming an elongated tip, wherein the elongated tip is operably connected to the first tab and wherein the spring clip is disposed around the interior structure.

8. The retaining device of claim 1, wherein the interior structure includes a cylindrical pin.

9. The retaining device of claim 1, further comprising a torsion spring that is positioned and oriented to govern lever motion of the first tab.

10. The retaining device of claim 1, wherein the first tab has a lever portion that is movable between an upper position and a lower position, wherein the upper position of the lever portion corresponds with the outwardly expanded position of the arms, and the lower position of the lever portion corresponds to the retracted position of the arms.

11. The retaining device of claim 1, wherein the head has a brake element that limits travel of the first tab.

12. The retaining device of claim 1, wherein the head has raised walls on opposite sides of the first tab.

* * * * *